United States Patent
Liu et al.

(10) Patent No.: US 10,185,450 B2
(45) Date of Patent: Jan. 22, 2019

(54) IN-CELL TOUCH DISPLAY PANEL WITH MATRIX-ARRANGED TOUCH ELECTRODES HAVING MULTIPLE COMMON ELECTRODES, METHOD OF MANUFACTURING, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wei Liu, Beijing (CN); Xue Dong, Beijing (CN); Haisheng Wang, Beijing (CN); Xiaochuan Chen, Beijing (CN); Xiaoliang Ding, Beijing (CN); Yingming Liu, Beijing (CN); Shengji Yang, Beijing (CN); Hongjuan Liu, Beijing (CN); Weijie Zhao, Beijing (CN); Changfeng Li, Beijing (CN); Lei Wang, Beijing (CN); Rui Xu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 130 days.

(21) Appl. No.: 15/302,996

(22) PCT Filed: Oct. 29, 2015

(86) PCT No.: PCT/CN2015/093183
§ 371 (c)(1),
(2) Date: Oct. 9, 2016

(87) PCT Pub. No.: WO2016/206265
PCT Pub. Date: Dec. 29, 2016

(65) Prior Publication Data
US 2017/0322650 A1 Nov. 9, 2017

(30) Foreign Application Priority Data
Jun. 23, 2015 (CN) .......................... 2015 1 0349909

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1343* (2013.01); *G02F 1/13338* (2013.01);
(Continued)

(58) Field of Classification Search
CPC ...... G06F 3/044; G06F 3/0416; G06F 3/0412; G06F 2203/04103; G02F 1/1343; G02F 1/13338; G09G 3/3648
See application file for complete search history.

(56) References Cited

U.S. PATENT DOCUMENTS 9,348,460 B2 * 5/2016 Lee .................... G06F 3/0418
9,927,832 B2 * 3/2018 Tanemura ................ G06F 1/16
(Continued)

FOREIGN PATENT DOCUMENTS

CN   104020891 A   9/2014
CN   104062817 A   9/2014
(Continued)

OTHER PUBLICATIONS

Second Office Action for Chinese Application No. 201510349909.2, dated Jan. 10, 2018, 6 Pages.
(Continued)

*Primary Examiner* — Darlene M Ritchie

(74) *Attorney, Agent, or Firm* — Brooks Kushman P.C.

(57) ABSTRACT

A touch display panel, methods for manufacturing and driving the touch display panel and a display device are provided. The touch display panel includes an array substrate including matrix-arranged touch electrodes and matrix-arranged pixel units. Each touch electrode includes multiple common electrodes. One touch lead is arranged between every two adjacent columns of pixel units. Each touch electrode is connected to a pin of the touch chip via a corresponding touch lead. The common electrodes further function as the touch electrodes in a touch phase.

18 Claims, 2 Drawing Sheets

(51) Int. Cl.
*G02F 1/1343* (2006.01)
*G06F 3/041* (2006.01)
*G09G 3/36* (2006.01)

(52) U.S. Cl.
CPC .......... *G06F 3/0412* (2013.01); *G06F 3/0416* (2013.01); *G06F 2203/04103* (2013.01); *G09G 3/3648* (2013.01)

(56) References Cited

U.S. PATENT DOCUMENTS

| | | | |
|---|---|---|---|
| 2014/0022210 A1* | 1/2014 | Wu | G02F 1/13338 345/174 |
| 2014/0055685 A1* | 2/2014 | Wang | G06F 3/0412 349/12 |
| 2014/0247239 A1* | 9/2014 | Jamshidi-Roudbari | G06F 3/0414 345/174 |
| 2014/0333582 A1* | 11/2014 | Huo | G02F 1/13338 345/174 |
| 2015/0042600 A1* | 2/2015 | Lukanc | G06F 3/0412 345/174 |
| 2015/0370114 A1 | 12/2015 | Du et al. | |
| 2016/0011705 A1* | 1/2016 | Huang | G06F 3/044 345/174 |
| 2016/0041666 A1* | 2/2016 | Lee | G02F 1/13338 345/174 |
| 2016/0109994 A1* | 4/2016 | Liu | G06F 3/0412 345/174 |
| 2016/0139727 A1* | 5/2016 | Kim | G06F 3/0416 345/174 |
| 2016/0246408 A1 | 8/2016 | Wang et al. | |
| 2016/0291722 A1* | 10/2016 | Du | G06F 3/044 |
| 2016/0291758 A1* | 10/2016 | Du | G06F 3/0412 |
| 2016/0293631 A1* | 10/2016 | Sun | G06F 3/041 |
| 2016/0327820 A1* | 11/2016 | Wu | G02F 1/13338 |
| 2016/0357310 A1 | 12/2016 | Wang et al. | |
| 2017/0045985 A1 | 2/2017 | Lv et al. | |
| 2017/0269738 A1* | 9/2017 | Chang | G06F 3/0412 |
| 2017/0344180 A1* | 11/2017 | Li | G06F 3/0416 |
| 2017/0357378 A1* | 12/2017 | Yao | G06F 3/0418 |

FOREIGN PATENT DOCUMENTS

| | | |
|---|---|---|
| CN | 104536636 A | 4/2015 |
| CN | 104598080 A | 5/2015 |
| CN | 104657022 A | 5/2015 |
| CN | 104699316 A | 6/2015 |
| CN | 104699349 A | 6/2015 |

OTHER PUBLICATIONS

First Office Action for Chinese Application No. 201510349909.2, dated Sep. 4, 2017, 8 Pages.
International Search Report and Written Opinion for Application No. PCT/CN2015/093183, dated Mar. 25, 2016, 8 Pages.

\* cited by examiner

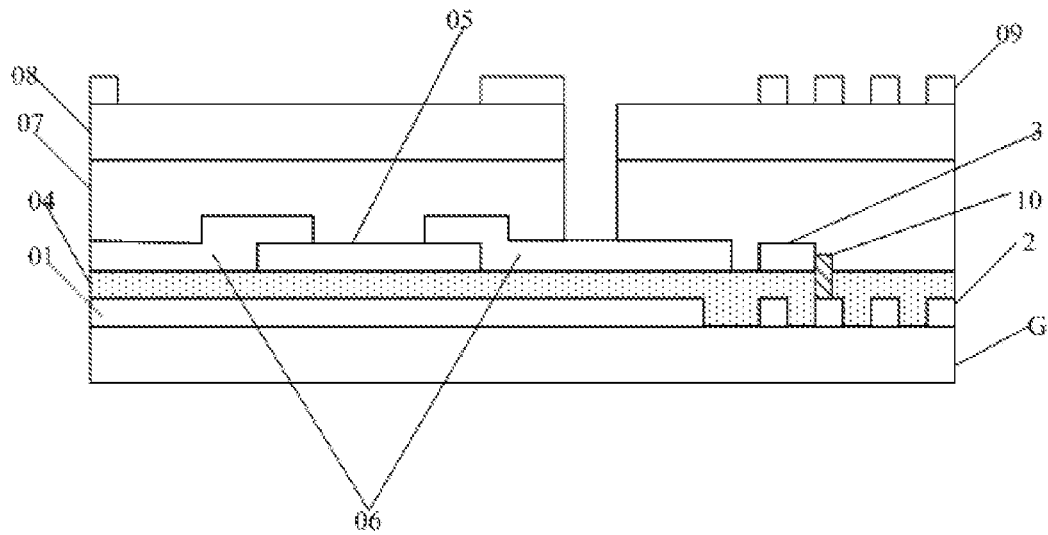

FIG. 3

| in a display phase, common electrode signals are applied to the touch leads of the touch display panel; and meanwhile gate scanning signals are applied to the gate lines of the touch display panel in turn and data signals are applied to the data lines | ⟵ S201 |

| in a touch control phase, touch scanning signals are applied to the touch leads of the touch display panel, and meanwhile, synchronization signals modulated with the touch scanning signals are applied to the gate lines and the data lines of the touch display panel, a touch signal generated at a touch location is transmitted to the touch chip via a corresponding touch lead, and the touch chip determines the touch location based on the touch signal | ⟵ S202 |

FIG. 4

IN-CELL TOUCH DISPLAY PANEL WITH MATRIX-ARRANGED TOUCH ELECTRODES HAVING MULTIPLE COMMON ELECTRODES, METHOD OF MANUFACTURING, AND DISPLAY DEVICE

CROSS-REFERENCE TO RELATED APPLICATIONS

This application is the U.S. national phase of PCT Application No. PCT/CN2015/093183 filed on Oct. 29, 2015, which claims priority to Chinese Patent Application No. 201510349909.2 filed on Jun. 23, 2015, the disclosures of which are incorporated in their entirety by reference herein.

TECHNICAL FIELD

The present disclosure relates to the field of touch display technology, and in particular to a touch display panel, methods for manufacturing and driving the touch display panel, and a display device.

BACKGROUND

Along with the development of display technology and its wide application in television and cell phone and in displaying public information, the large-size display panel gradually takes an important role in our daily life. Moreover, along with the rapid development of the display technology, the touch screen panel is widely applied in our daily life. Nowadays, good user experience is highly desired, while the large-size display panel is greatly flawed for its touch performance. To meet the market requirement, it is a market development trend to make a module thinner. Along with the development of the touch screen and subject to the technology or the cost, the touch structure has developed from out-cell to in-cell, and thus the touch panel may be thinned and the cost of the touch screen may be reduced significantly. At present, there are three types of in-cell touch panel, including a resistive touch panel, a capacitive touch panel and an optical touch panel, and corresponding in-cell touch technology has been applied to a small-size display. Due to good touch performance of the small-size display using in-cell touch technology, the in-cell touch technology turns into a trend of the touch design in the future and may guide us to achieve a large-size display panel with good touch performance.

It is expected by those skilled in the art to make a large-size display panel with good touch performance at low cost.

SUMMARY

The present disclosure provides a touch display panel, methods for manufacturing and driving the touch display panel and a display device, so as to realize a good touch performance of a large-size display panel at low cost. In one aspect, a touch display panel is provided in the present disclosure, including an array substrate which includes matrix-arranged touch electrodes and matrix-arranged pixel units, source and drain electrodes, gate electrodes, gate lines, data lines and a touch chip. Each of the touch electrodes includes multiple common electrodes. One touch lead is arranged between every two adjacent columns of pixel units. Each touch electrode is connected to a pin of the touch chip via a corresponding touch lead. Common electrode signals are applied to the touch electrodes via the touch leads in a display phase, touch scanning signals are applied to the touch electrodes via the touch leads in a touch phase, and a touch signal generated at a touch location is transmitted to the touch chip via a touch lead corresponding to the touch location.

Optionally, the touch electrodes are arranged at a layer identical to the gate electrodes and insulated from the gate electrodes, the touch leads are arranged at a layer identical to the data lines and parallel to the data lines, and each of the touch electrodes is electrically connected to the corresponding touch lead through via-holes.

Optionally, the multiple common electrodes included in each touch electrode are matrix-arranged, and in each touch electrode, the common electrodes in each row are connected to each other via one connection line.

Optionally, one column of the common electrodes among all the common electrodes included in each touch electrode is electrically connected to the corresponding touch lead through the via-holes.

Optionally, the connection lines are arranged at a layer identical to the gate lines and parallel to the gate lines.

Optionally, each of the pixel units includes multiple sub-pixels, and the common electrodes of the touch electrodes correspond to the sub-pixel of the pixel units respectively.

Optionally, the touch electrodes are made of a material different from the gate electrodes, and the touch leads are made of a material identical to the data lines.

In another aspect, a display device is provided in some embodiments of the present disclosure, including the touch display panel hereinabove.

In another aspect, a method for manufacturing the touch display panel hereinabove is provided in some embodiments of the present disclosure, including: forming, on a base substrate, a pattern of the matrix-arranged touch electrodes, where each of the touch electrodes includes multiple common electrodes; and forming, on the base substrate provided with the pattern of the touch electrodes, a pattern of the touch leads between adjacent columns of the pixel units, where the common electrode signals are applied to the touch electrodes via the touch leads in the display phase, the touch scanning signals are applied to the touch electrodes via the touch leads in the touch phase, and the touch signal generated at the touch location is transmitted to the touch chip via the touch lead corresponding to the touch location.

Optionally, the step of forming, on the base substrate provided with the pattern of the touch electrodes, the pattern of the touch leads between adjacent columns of the pixel units includes: forming, on the base substrate provided with the pattern of the touch electrodes, patterns of the source and drain electrodes, the data lines and the touch leads by one patterning process.

Optionally, subsequent to the step of forming the pattern of the touch electrodes on the base substrate and prior to the step of forming the patterns of the source and drain electrodes, the data lines and the touch leads, the method further includes: forming, on the base substrate provided with the pattern of the touch electrodes, patterns of the gate electrodes, the gate lines, the connection lines, a gate insulation layer and an active layer.

Optionally, the step of forming, on the base substrate provided with the pattern of the touch electrodes, the patterns of the gate electrodes, the gate lines, the connection lines, the gate insulation layer and the active layer includes: forming, on the base substrate provided with the pattern of the touch electrodes, the patterns of the gate electrodes, the gate lines and the connection lines by one patterning process; and forming, on the base substrate provided with the patterns of the gate electrodes, the gate lines and the connection lines, the pattern of the active layer.

Optionally, subsequent to the step of forming the pattern of the touch leads on the base substrate, the method further includes forming, on the base substrate provided with the pattern of the touch leads, patterns of a passivation layer and pixel electrodes.

Optionally, the step of forming, on the base substrate provided with the pattern of the touch leads, the pattern of the passivation layer includes: forming, on the base substrate provided with the pattern of the touch leads, the pattern of the passivation layer by one patterning process; or forming, on the base substrate provided with the pattern of the touch leads, a pattern of a first passivation layer through a resin process, and forming a pattern of a second passivation layer on the base substrate provided with the pattern of the first passivation layer.

In another aspect, a method for driving the touch display panel hereinabove is provided in some embodiments of the present disclosure, including: applying, in the display phase, the common electrode signals to the touch leads of the touch display panel, and meanwhile applying gate scanning signals to the gate lines of the touch display panel in turn and applying data signals to the data lines; and applying, in the touch phase, the touch scanning signals to the touch leads of the touch display panel, and meanwhile applying synchronization signals modulated with the touch scanning signals to the gate lines and the data lines of the touch display panel, transmitting the touch signal generated at the touch location to the touch chip via the touch lead corresponding to the touch location, and determining, by the touch chip, the touch location based on the touch signal.

The present disclosure provides in the embodiments the touch display panel, the methods for manufacturing and driving the touch display panel, and the display device. The touch display panel includes an array substrate including matrix-arranged touch electrodes and matrix-arranged pixel units. Each touch electrode includes multiple common electrodes. One touch lead is arranged between every two adjacent columns of pixel units, and each touch electrode is connected to a pin of the touch chip via a corresponding touch lead. Common electrode signals are applied to the common electrodes included in the touch electrodes via the touch leads in a display phase. Touch scanning signals are applied to the common electrodes included in the touch electrodes via the touch leads in a touch phase. A touch signal generated at a touch location is transmitted to the touch chip via the touch lead. With this structure, the common electrodes further function as the touch electrodes in the touch phase, and the self-capacitive in-cell touch technology is achieved by simply arranging the touch leads between adjacent columns of pixel units without any additional manufacturing process. Thus, the in-cell touch technology is achieved in the large-size display panel, the large-size display panel is ensured with good display and touch performances at low cost. In addition, the touch leads do not overlap pixel electrodes; therefore, an overall stray capacitance is relatively small, such that touch drive scanning can be performed with sufficient time, which is beneficial to the touch drive scanning and touch detection.

BRIEF DESCRIPTION OF THE DRAWINGS

FIG. 3 is a schematic view of an overall layer structure of a touch display panel in some embodiments of the present disclosure; and FIG. 4 is a flow chart showing a method for driving a touch display panel in some embodiments of the present disclosure.

DETAILED DESCRIPTION

Figure 1:
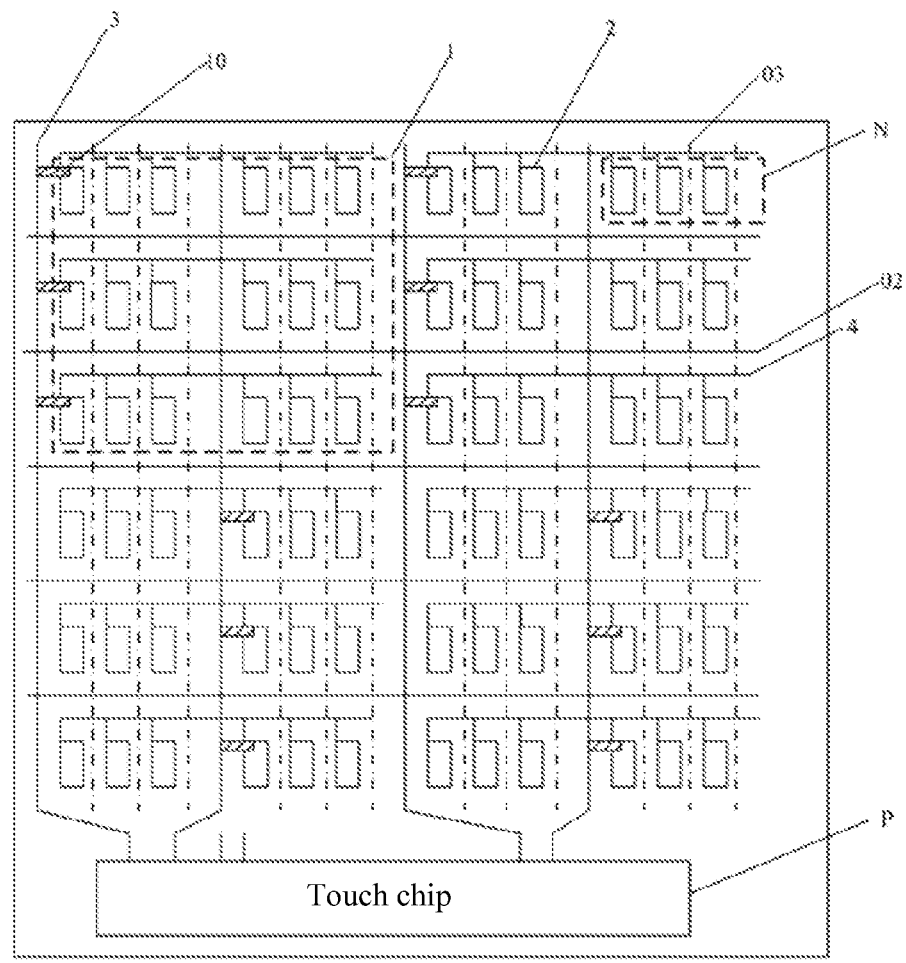
FIG. 1 is a schematic view of a touch display panel in some embodiments of the present disclosure.

A touch display panel, methods for manufacturing and driving the touch display panel and a display device according to embodiments of the present disclosure will be described hereinafter in conjunction with the drawings and specific implementations.

Thicknesses of film layers and sizes and shapes of regions shown in the drawings do not represent actual sizes of components of the touch display panel, which are merely for illustration in the description.

As shown in FIG. 1, a touch display panel is provided in some embodiments of the present disclosure, which may include an array substrate including matrix-arranged touch electrodes 1 and matrix-arranged pixel units.

Each touch electrode 1 includes multiple common electrodes 2, one touch lead 3 is arranged between every two adjacent columns of pixel units, and each touch electrode 1 is connected to a pin of a touch chip via a corresponding touch lead 3.

Common electrode signals are applied to the touch electrodes 1 via the touch leads 3 in a display phase. Touch scanning signals are applied to the touch electrodes 1 via the touch leads 3 in a touch phase. A touch signal generated at a touch location is transmitted to the touch chip via a touch lead 3 corresponding to the touch location.

FIG. 1 is a schematic view of a touch display panel in some embodiments of the present disclosure. The region labeled by a dashed box N in FIG. 1 corresponds to a region of one pixel unit, and a region of one common electrode 2 corresponds to a region of one sub-pixel. In FIG. 1, it is taken the case that one pixel unit includes three sub-pixels for example. Practically, one pixel unit may include more than three sub-pixels. The touch display panel may include an array substrate that includes matrix-arranged touch electrodes 1 and matrix-arranged pixel units. Each touch electrode 1 includes multiple common electrodes 2, one touch lead 3 is arranged between every two adjacent columns of pixel units, and each touch electrode 1 is connected to a pin of the touch chip P via a corresponding touch lead 3. A common electrode signal is applied to the multiple common electrodes 2 included in each touch electrode 1 via the touch lead 3 corresponding to the each touch electrode 1 in a display phase. A touch scanning signal is applied to the multiple common electrodes 2 included in each touch electrode 1 via the touch lead 3 corresponding to the each touch electrode 1 in a touch phase. A touch signal generated at a touch location is transmitted to the touch chip via a touch lead 3 corresponding to the touch location. With this structure, the common electrodes further function as the touch electrodes in the touch phase, and the self-capacitive in-cell touch technology is achieved by simply arranging the touch leads between adjacent columns of pixel units without any additional manufacturing process. Thus, the in-cell touch technology is achieved in the large-size display panel, the large-size display panel is ensured with good display and touch performances at low cost. In addition, the touch leads do not overlap pixel electrodes; therefore, an overall stray capacitance is relatively small, such that touch drive scanning can be performed with sufficient time, which is beneficial to the touch drive scanning and touch detection.

Practically, in the touch display panel according to the embodiments of the present disclosure, the common electrodes further function as the touch electrodes in the touch phase so as to implement the touch function. As shown in FIG. 1, the touch electrodes 1 may be arranged at a layer identical to gate electrodes (not shown in FIG. 1) and insulated from the gate electrodes, the touch leads 3 are arranged at a layer identical to data lines 03 and parallel to the data lines 03, and each touch electrode 1 is electrically connected to one corresponding touch lead 3 through via-holes 10. To be specific, the touch electrodes are arranged at a layer identical to the gate electrodes but made of a different material from the gate electrodes. The gate electrodes are generally made of a metallic material such as copper and aluminum, while the touch electrodes are generally made of an ITO material. When manufacturing the touch display panel, the gate electrodes and the touch electrodes are formed in two patterning processes respectively. The touch leads are arranged at a layer and made of a material identical to the data lines, accordingly, the touch leads and the data lines can be formed by one patterning process, which reduces manufacturing cost.

Practically, in the touch display panel according to the embodiments of the present disclosure, as shown in FIG. 1, each touch electrode 1 includes an array formed by certain amounts of columns and rows of common electrodes 2. Each touch electrode 1 corresponds to one touch lead 3. In each touch electrode, the common electrodes 2 in each row are connected to each other via one connection line 4. With such structure, as long as one column of common electrodes among all common electrodes of each touch electrode 1 are connected to the corresponding touch lead, the common electrodes of the each touch electrode that are arranged in the same row may receive an identical signal via the touch lead, and then, the common electrodes in all the touch electrodes may receive common electrode signals in the display phase and may receive touch scanning signals in the touch phase, so as to drive the touch display panel to implement a display function in the display phase and a touch function in the touch phase.

Practically, in some embodiments of the present disclosure, in order to drive the touch display panel to implement the display function in the display phase and the touch function in the touch phase, each touch electrode is connected to one corresponding touch lead, and the common electrodes of each touch electrode are matrix-arranged. One column of common electrodes among all the common electrodes of each touch electrode may be electrically connected to one corresponding touch lead through the via-holes, and since the common electrodes in each row are connected to each other via one connection line, the common electrodes in the same row may receive an identical signal via the touch lead. Then, the common electrodes in all the touch electrodes may receive the common electrode signals in the display phase and the touch scanning signals in the touch phase, so as to drive the touch display panel to implement the display function in the display phase and the touch function in the touch phase.

In some embodiments of the present disclosure, in order to enable the multiple common electrodes of each touch electrode to receive an identical signal simultaneously, in each touch electrode, the common electrodes in each row need to be connected to each other via one connection line.

In this way, in each touch electrode, the common electrodes in the same row may receive an identical signal synchronously in the same time period. As shown in FIG. 1, the connection lines 4 may be arranged at a layer identical to the gate lines 02 and parallel to the gate lines 02, and the connection lines 4 may be made of a material identical to the gate lines 02; therefore, the gate lines and the connection lines may be formed by one patterning process in the manufacturing process of the touch display panel, reducing the manufacturing cost.

Practically, in the touch display panel according to some embodiments of the present disclosure, each pixel unit includes multiple sub-pixels (e.g., red (R) sub-pixels, green (G) sub-pixels and blue (B) sub-pixels). The common electrodes included in the touch electrode correspond to sub-pixels of the pixel unit respectively, i.e., the common electrodes correspond to pixel electrodes respectively. In the display phase, common electrode signals are applied to the common electrodes, so as to implement a normal displaying of the display panel. In the touch phase, the common electrodes further function as the touch electrodes. The common electrodes are properly arranged in rows and columns based on touch precision and sized of the touch display panel so as to form the touch electrodes with the touch function. In addition, the touch electrodes are connected to the pins of the touch chip via corresponding touch leads. The touch scanning signals are applied to the touch electrodes via the touch leads in the touch phase, and a touch signal generated at a touch location is transmitted to the touch chip via the corresponding touch lead, and then the touch chip determines the touch location based on the touch signal.

Based on the identical concept, a display device is provided in some embodiment of the present disclosure, including the touch display panel hereinabove in the embodiments of the present disclosure. The display device may be applied to a product or a component with a display function such as cell phone, tablet PC, television, display, laptop computer, digital photo frame and navigator. A working principle of the display device is similar to that of the touch display panel, so implementations of the touch display panel hereinabove may be used as reference to understand implementations of the display device, and the detail description is not repeated herein.

Figure 2:
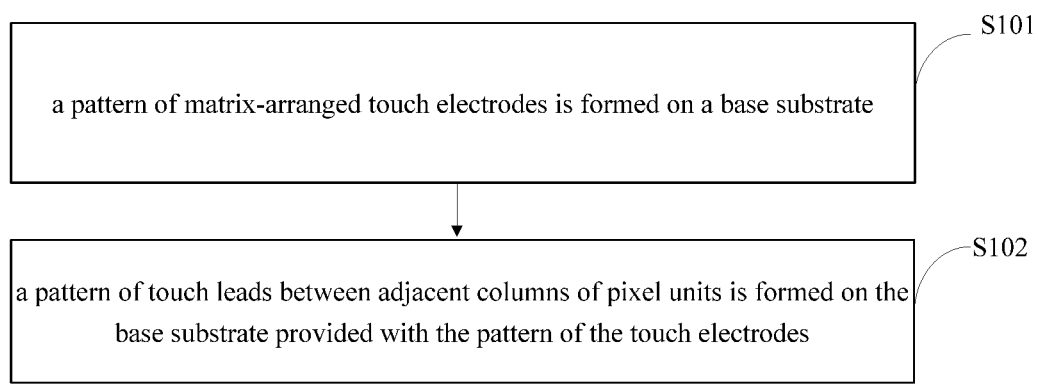
FIG. 2 is a flow chart showing a method for manufacturing a touch display panel in some embodiments of the present disclosure.

Based on the identical concept, a method for manufacturing the touch display panel hereinabove is provided in some embodiments of the present disclosure. As shown in FIG. 2, the method may include the following steps.

In S101, a pattern of matrix-arranged touch electrodes is formed on a base substrate. Each touch electrode includes multiple common electrodes.

In S102, a pattern of touch leads between adjacent columns of pixel units is formed on the base substrate provided with the pattern of the touch electrodes. Common electrode signals are applied to the touch electrodes via the touch leads in a display phase, touch scanning signals are applied to the touch electrodes via the touch leads in a touch phase, and a touch signal generated at a touch location is transmitted to the touch chip via a corresponding touch lead.

In some embodiments of the present disclosure, each pixel unit includes multiple sub-pixels, and the common electrodes correspond to the sub-pixels of the pixel units respectively.

According to the method for manufacturing the touch display panel hereinabove, the common electrodes further function as the touch electrodes in the touch phase, and the touch function is achieved by simply arranging the touch leads between adjacent columns of pixel units without changing an original layered structure of the display panel. The self-capacitive in-cell touch technology is achieved without causing additional manufacturing process. Hence, the in-cell technology is achieved in the large-size display panel, the large-size display panel is ensured with good display and touch performances at low cost. In addition, the touch leads do not overlap pixel electrodes; therefore, an overall stray capacitance is relatively small, such that touch drive scanning can be performed with sufficient time, which is beneficial to the touch drive scanning and touch detection.

Practically, in some embodiments of the present disclosure, the step S102 of the method for manufacturing the touch display panel may include: forming, on the base substrate provided with the pattern of the touch electrodes, patterns of source and drain electrodes, data lines and the touch leads by one patterning process. To be specific, according to the method for manufacturing the touch display panel in the embodiments of the present disclosure, the in-cell technology is achieved in the large-size display panel, the large-size display panel is ensured with good display and touch performances at low cost. Therefore, on the basis of not changing an original layered structure of the display panel, touch leads are arranged between adjacent columns of pixel units and the common electrodes further function as the touch electrodes in the touch phase, so to implement the touch function. In addition, the touch leads may be arranged at a layer identical to the source and drain electrodes and the data lines, and the touch leads may be formed together with the source and drain electrodes and the data lines by one pattering process, thereby reducing the manufacturing cost.

Practically, according to some embodiments of the present disclosure, subsequent to the step of forming the pattern of the touch electrodes on the base substrate and prior to the step of forming the patterns of the source and drain electrodes, the data lines and the touch leads, the method for manufacturing the touch display panel further includes: forming, on the base substrate provided with the pattern of the touch electrodes, patterns of gate electrodes, gate lines, connection lines, a gate insulation layer and an active layer. To be specific, in order to implement display and touch functions of the touch display panel, the touch display panel may be provided with necessary structures such as gate electrodes, gate lines, a gate insulation layer and an active layer. Functions and manufacturing processes for those necessary structures are similar to functions and manufacturing processes for related layer structures of the touch display panel in the related technology; hence, detailed description is not given herein. In the present disclosure, the connection lines which connect multiple common electrodes in respective rows in each touch electrode may be arranged at a layer identical to the gate electrodes and may be formed by one patterning process together with the gate electrodes, which reduces the manufacturing cost. To be specific, the manufacturing process may include: forming, on the base substrate provided with the pattern of the touch electrodes, patterns of gate electrodes, gate lines and connection lines by one patterning process; and forming, on the base substrate provided with the patterns of the gate electrodes, the gate lines and the connection lines, a pattern of an active layer. Processes such as depositing and etching of the layers in the manufacturing process are similar to the related technology and are not detailed herein.

Practically, in some embodiments of the present disclosure, subsequent to the step of forming the pattern of the touch leads, the method for manufacturing the touch display panel may further include: forming, on the base substrate provided with the pattern of the touch leads, patterns of a passivation layer and pixel electrodes, where the pixel electrodes correspond to the respective common electrodes in a one-to-one correspondence. To be specific, in order to make the touch display panel to display normally in the display phase, the patterns of the passivation layer and the pixel electrodes are further required to be formed on the base substrate provided with the pattern of the touch leads, such that the common electrode signals are applied to the common electrodes in the display phase to drive the display panel to display. In the touch phase, the common electrodes further function as the touch electrodes and the touch scanning signals are applied to the touch electrodes via the touch leads to realize touch scanning; then, a touch signal generated at a touch location is transmitted to the touch chip via a corresponding touch lead, and the touch chip determines the touch location based on the touch signal.

Practically, in the method for manufacturing the touch display panel according to some embodiments of the present disclosure, the step of forming, on the base substrate provided with the pattern of the touch leads, the pattern of the passivation layer includes: forming, on the base substrate provided with the pattern of the touch leads, the pattern of the passivation layer by one patterning process; or forming, on the base substrate provided with the pattern of the touch leads, a pattern of a first passivation layer through a resin process, and forming a pattern of a second passivation layer on the base substrate provided with the pattern of the first passivation layer. To be specific, in order to insulate a source and drain electrode layer from a pixel electrode layer, it is required to arrange a passivation layer between the source and drain electrode layer and pixel electrode layer. There may be one or two passivation layers. In the case that there exist two passivation layers, the first passivation layer may be a resin layer. By arranging the resin layer between the source and drain electrodes and the pixel electrodes, capacitances between the source and drain electrodes and the pixel electrodes may be reduced, thereby reducing an RC delay of the source and drain electrodes and then reducing a power consumption of the display panel.

To be specific, an overall layer structure of a touch display panel manufactured by the method hereinabove is shown in FIG. 3. The gate electrode 01 is arranged at a layer identical to the common electrodes 2 (i.e., the touch electrode) and is arranged on a base substrate G. A gate insulation layer 04 is arranged on the gate electrode 01 and the common electrodes 2. An active layer 05, source and drain electrodes 06, a touch lead 3 and a data line (not shown in FIG. 3) are arranged on the gate insulation layer 04. The common electrode 2 is electrically connected to the touch lead 3 through a via-hole 10. A first passivation layer 07 (i.e., a resin layer) is arranged on the active layer 05, the source and drain electrodes 06 and the touch lead 3. A second passivation layer 08 is arranged on the first passivation layer 07. Pixel electrodes 09 are arranged on the second passivation layer 08. The structure hereinabove is merely an implementation of the touch display panel. In practical manufacture and application, the touch display panel is not limited the above described structure, and the layer structure of the touch display panel may be modified, e.g., adding more layers or reducing the layers according to manufacturing requirements, so as to implement various types of display panels, while detailed description is not given herein.

Based on the identical concept, a method for driving the touch display panel hereinabove is provided in some embodiments of the present disclosure. As shown in FIG. 4, the method may include the followings steps.

In S201, in a display phase, common electrode signals are applied to the touch leads of the touch display panel; and meanwhile gate scanning signals are applied to the gate lines of the touch display panel in turn and data signals are applied to the data lines.

In S202, in a touch phase, touch scanning signals are applied to the touch leads of the touch display panel, and meanwhile, synchronization signals modulated with the touch scanning signals are applied to the gate lines and the data lines of the touch display panel. A touch signal generated at a touch location is transmitted to the touch chip via a corresponding touch lead, and the touch chip determines the touch location based on the touch signal.

According to the method for driving the touch display panel hereinabove, the display panel is driven to implement the display function in the display phase and the touch function in the touch phase, such that the touch display panel is driven in a time-division manner in the touch phase and the display phase. The common electrodes further function as the touch electrodes in the touch phase. In the display phase, the common electrode signals are applied to the common electrodes via the touch leads. In the touch phase, the touch scanning signals are applied to the touch leads so as to drive the touch display panel to perform touch scanning; at the same time, synchronization signals modulated with the touch scanning signals are applied to the gate lines and the data lines, so as to reduce stray capacitances between the touch electrodes and other electrode lines and reduce RC delay between the touch electrodes and other electrode lines. In addition, the touch signal generated at the touch location is transmitted to the touch chip via the touch lead, and then the touch chip determines the touch location based on the touch signal. As a result, the self-capacitive in-cell touch technology is achieved in the large-size display panel, and the large-size display panel is ensured with good display and touch performances at low cost.

The present disclosure provides in the embodiments the touch display panel, the methods for manufacturing and driving the touch display panel, and the display device. The touch display panel includes an array substrate including matrix-arranged touch electrodes and matrix-arranged pixel units. Each touch electrode includes multiple common electrodes. One touch lead is arranged between every two adjacent columns of pixel units, and each touch electrode is connected to a pin of the touch chip via a corresponding touch lead. Common electrode signals are applied to the touch electrodes via the touch leads in a display phase. Touch scanning signals are applied to the touch electrodes via the touch leads in a touch phase. A touch signal generated at a touch location is transmitted to the touch chip via the touch lead. With this structure, the common electrodes further function as the touch electrodes in the touch phase, and the self-capacitive in-cell touch technology is achieved by simply arranging the touch leads between adjacent columns of pixel units without any additional manufacturing process. Thus, the in-cell touch technology is achieved in the large-size display panel, the large-size display panel is ensured with good display and touch performances at low cost. In addition, the touch leads do not overlap pixel electrodes; therefore, an overall stray capacitance is relatively small, such that touch drive scanning can be performed with sufficient time, which is beneficial to the touch drive scanning and touch detection.

Obviously, a person skilled in the art may make further modifications and alternations to the present disclosure without departing from the principle of the present disclosure, and the present disclosure intends to include all these modifications and alternations if they fall within the scope of the present disclosure and equivalent technologies.

What is claimed is:

1. A touch display panel, comprising an array substrate that comprises matrix-arranged touch electrodes and matrix-arranged pixel units, source and drain electrodes, gate electrodes, gate lines, data lines, and a touch chip, wherein
each of the touch electrodes comprises a plurality of common electrodes arranged in rows and columns, each of the touch electrodes is connected to a pin of the touch chip via a corresponding touch lead, one touch lead is arranged between every two adjacent columns of the pixel units, and each of the plurality of pixel units comprises a plurality of subpixels corresponding to each of the plurality of common electrodes, wherein all of the plurality of common electrodes in a same row comprised in each touch electrode are connected to a same row connection line, wherein one of the plurality of common electrodes in the same row is electrically connected to other ones of the plurality of common electrodes in a same column and in sequentially-adjacent rows via the corresponding touch lead through corresponding via holes; and
common electrode signals are applied to the touch electrodes via the touch leads in a display phase, touch scanning signals are applied to the touch electrodes via the touch leads in a touch phase, and a touch signal generated at a touch location is transmitted to the touch chip via a touch lead corresponding to the touch location.

2. The touch display panel according to claim 1, wherein the connection line is arranged at a layer identical to the gate lines and parallel to the gate lines.

3. A display device, comprising the touch display panel according to claim 1.

4. The touch display panel according to claim 1, wherein each touch lead is at a layer above that of the common electrodes and below that of pixel electrodes of the subpixels on the array substrate.

5. The touch display panel according to claim 1, wherein the touch electrodes are arranged at a layer identical to the gate electrodes and insulated from the gate electrodes, the touch leads are arranged at a layer identical to the data lines and parallel to the data lines.

6. The touch display panel according to claim 5, wherein the plurality of common electrodes comprised in each touch electrode is matrix-arranged.

7. The touch display panel according to claim 5, wherein the touch electrodes are made of a material different from the gate electrodes, and the touch leads are made of a material identical to the data lines.

8. The touch display panel according to claim 1, wherein the plurality of common electrodes comprised in each touch electrode is matrix-arranged, and one column of the columns comprised in each touch electrode directly adjacent to the corresponding touch lead is electrically connected to the corresponding touch lead through the corresponding via holes.

9. The touch display panel according to claim 8, wherein the one column of the columns comprised in each touch electrode directly adjacent to the corresponding touch lead is located at a right side of the corresponding touch lead.

10. The touch display panel according to claim 8, wherein three columns of common electrodes are between two directly adjacent touch leads.

11. The touch display panel according to claim 8, wherein the plurality of common electrodes comprised in each touch electrode is matrix-arranged into three-rows and six columns.

12. A method for manufacturing a touch display panel, wherein the touch display panel comprises an array substrate comprising matrix-arranged touch electrodes and matrix-arranged pixel units, source and drain electrodes, gate electrodes, gate lines, data lines, and a touch chip, wherein
- each of the touch electrodes comprises a plurality of common electrodes arranged in rows and columns, each of the touch electrodes is connected to a pin of the touch chip via a corresponding touch lead, one touch lead is arranged between every two adjacent columns of the pixel units, and each of the plurality of pixel units comprises a plurality of subpixels corresponding to each of the plurality of common electrodes, wherein all of the plurality of common electrodes in a same row comprised in each touch electrode are connected to a same row connection line, wherein one of the plurality of common electrodes in the same row is electrically connected to other ones of the plurality of common electrodes in a same column and in sequentially-adjacent rows via the corresponding touch lead through corresponding via holes; and
- common electrode signals are applied to the touch electrodes via the touch leads in a display phase, touch scanning signals are applied to the touch electrodes via the touch leads in a touch phase, and a touch signal generated at a touch location is transmitted to the touch chip via a touch lead corresponding to the touch location;
- wherein the method comprises
- forming, on a base substrate, a pattern of the matrix-arranged touch electrodes; and
- forming, on the base substrate provided with the pattern of the touch electrodes, a pattern of the touch leads between adjacent columns of the pixel units.

13. The method according to claim 12, wherein the step of forming, on the base substrate provided with the pattern of the touch electrodes, the pattern of the touch leads between adjacent columns of the pixel units comprises:
- forming, on the base substrate provided with the pattern of the touch electrodes, patterns of the source and drain electrodes, the data lines and the touch leads by one patterning process.

14. The method according to claim 13, wherein subsequent to the step of forming the pattern of the touch electrodes on the base substrate and prior to the step of forming the patterns of the source and drain electrodes, the data lines and the touch leads, the method further comprises:
- forming, on the base substrate provided with the pattern of the touch electrodes, patterns of the gate electrodes, the gate lines, the connection lines, a gate insulation layer and an active layer.

15. The method according to claim 14, wherein the step of forming, on the base substrate provided with the pattern of the touch electrodes, the patterns of the gate electrodes, the gate lines, the connection lines, the gate insulation layer and the active layer comprises:
- forming, on the base substrate provided with the pattern of the touch electrodes, the patterns of the gate electrodes, the gate lines and the connection lines by one patterning process; and
- forming, on the base substrate provided with the patterns of the gate electrodes, the gate lines and the connection lines, the pattern of the active layer.

16. The method according to claim 12, wherein subsequent to the step of forming the pattern of the touch leads on the base substrate, the method further comprises:
- forming, on the base substrate provided with the pattern of the touch leads, patterns of a passivation layer and pixel electrodes.

17. The method according to claim 16, wherein the step of forming, on the base substrate provided with the pattern of the touch leads, the pattern of the passivation layer comprises:
- forming, on the base substrate provided with the pattern of the touch leads, the pattern of the passivation layer by one patterning process; or
- forming, on the base substrate provided with the pattern of the touch leads, a pattern of a first passivation layer through a resin process, and forming a pattern of a second passivation layer on the base substrate provided with the pattern of the first passivation layer.

18. A method for driving a touch display panel, wherein the touch display panel comprises an array substrate comprising matrix-arranged touch electrodes and matrix-arranged pixel units, source and drain electrodes, gate electrodes, gate lines, data lines, and a touch chip, wherein
- each of the touch electrodes comprises a plurality of common electrodes arranged in rows and columns, each of the touch electrodes is connected to a pin of the touch chip via a corresponding touch lead, one touch lead is arranged between every two adjacent columns of the pixel units, and each of the plurality of pixel units comprises a plurality of subpixels corresponding to each of the plurality of common electrodes, wherein all of the plurality of common electrodes in a same row comprised in each touch electrode are connected to a same row connection line, wherein one of the plurality of common electrodes in the same row is electrically connected to other ones of the plurality of common electrodes in a same column and in sequentially-adjacent rows via the corresponding touch lead through corresponding via holes; and
- common electrode signals are applied to the touch electrodes via the touch leads in a display phase, touch scanning signals are applied to the touch electrodes via the touch leads in a touch phase, and a touch signal generated at a touch location is transmitted to the touch chip via a touch lead corresponding to the touch location;
- wherein the method comprises
- applying, in the display phase, the common electrode signals to the touch leads of the touch display panel, and meanwhile applying gate scanning signals to the gate lines of the touch display panel in turn and applying data signals to the data lines; and
- applying, in the touch phase, the touch scanning signals to the touch leads of the touch display panel, and meanwhile applying synchronization signals modulated with the touch scanning signals to the gate lines and the data lines of the touch display panel; transmitting the touch signal generated at the touch location to the touch chip via the touch lead corresponding to the touch location, and determining, by the touch chip, the touch location based on the touch signal.

* * * * *